(12) United States Patent
Vollmer et al.

(10) Patent No.: US 6,983,409 B1
(45) Date of Patent: Jan. 3, 2006

(54) METHOD OF REPEAT TRANSMISSION OF MESSAGES IN A CENTRALLY CONTROLLED COMMUNICATION NETWORK

(75) Inventors: Vasco Vollmer, Gartow (DE); Markus Radimirsch, Laatzen (DE)

(73) Assignee: Robert Bosch GmbH, Stuttgart (DE)

( * ) Notice: Subject to any disclaimer, the term of this patent is extended or adjusted under 35 U.S.C. 154(b) by 819 days.

(21) Appl. No.: 09/595,260

(22) Filed: Jun. 15, 2000

(30) Foreign Application Priority Data

Jun. 17, 1999 (DE) ............................. 199 27 639

(51) Int. Cl.
G08C 25/02 (2006.01)
H04L 1/18 (2006.01)

(52) U.S. Cl. ...................... 714/748; 455/503; 455/517; 455/524

(58) Field of Classification Search . 714/748–749,750; 455/524, 503, 517
See application file for complete search history.

(56) References Cited

U.S. PATENT DOCUMENTS

| 4,841,526 A | 6/1989 | Wilson |
| 5,699,367 A * | 12/1997 | Haartsen ..................... 714/749 |
| 6,557,134 B2 * | 4/2003 | Bims et al. ................. 714/748 |

FOREIGN PATENT DOCUMENTS

| EP | 0 749 225 A | 12/1996 |
| EP | 0 820 167 A | 1/1998 |
| EP | 0 876 023 A | 11/1998 |

OTHER PUBLICATIONS

Lima De H M et al: "An Effective Selective Repeat ARO Strategy . . . " IEEE Vehicular Technology Conference, US, New York, IEEE, BD. Conf 47, Nov. 18, 1996, pp. 1059-1063.
A. S. Tanenbaum : "Computernetwerke", Prentice Hall, Muenchen, 1998, pp. 227-244.
B. Walke: "Mobilfunknetze Undihre Protokole", B. G. Teubner, Stutttgart, 1998, pp. 91-99.
Waters A G et al: "Broadcast File Distribution Protocols for Satellite Networks. National Conference on Telecommunications, York, Apr. 2-5, 1989, pp. ", National Conference on Telecommunications, London, IEE, GB, BD, Conf. 2, Apr. 2, 1989, pp. 133-138.
Ram Chandran S et al: "Selective-Repeat-ARQ Schemes for Broadcast Links" IEEE Transactions on Communications, US IEEE Inc. New York, BD. 40, NR. 1, 1992, pp. 12-19.
D. Petras: "Entwicklung Und Leistungsbewertung Einer ATM-Funkschnittstelle", Dissertation N an Der RWTH Aachen, 1998, Kapitel 8.3, pp. 81-85.
D. Bertsekas, R. Gallger: "Data Networks", Prentice Hall, Englewood Cliffs, New Jersey, 1992, pp. 61-68.

* cited by examiner

*Primary Examiner*—Guy J. Lamarre
(74) *Attorney, Agent, or Firm*—Michael J. Striker

(57) ABSTRACT

In a method for repeat transmission of messages in a centrally controlled communication network including a plurality of terminals and a central station messages assigned sequence numbers are broadcast or multicast from the central station for reception by terminals of a participating group. As soon as a terminal detects loss of a transmitted message or an error in the transmitted message, it transmits a repeat request for repeat transmission of that message, which includes the sequence number of the lost or erroneous message, over another communication link, especially a point-to-point communication link. The central station repeats the message transmission of the lost or erroneous message but only until a predetermined maximum number of repetitions occurs within a predetermined time interval or until a positive acknowledgement of receipt of the previously lost or erroneous message is received.

12 Claims, 1 Drawing Sheet

METHOD OF REPEAT TRANSMISSION OF MESSAGES IN A CENTRALLY CONTROLLED COMMUNICATION NETWORK

BACKGROUND OF THE INVENTION

1. Field of the Invention

The present invention relates to a method of repeat transmission of messages in a centrally controlled communication network.

2. Prior Art

In a centrally controlled, especially cellular, radio network, a central station ZE is provided, as shown in FIG. 1, to which several terminals T1, T2, . . . can be connected. These terminals can be, for example, telephones, but also could be PCs (personal computers) or other units. This type of system operates, for example, in a link-oriented mode, i.e. prior to exchange of data with other terminals that are connected to the network or the central station ZE, at least one link or connection must be established.

Besides this connection or link in which only one terminal is operated, there are also connections or links, in which several or all terminals are simultaneously operated (Multicast, Broadcast). Complete error correction does not occur in the existing systems. However high error probabilities must be taken into account, especially in radio transmissions. Various methods have been developed to permit error sensitive transmission of data. In most cases a combination of error protective coding (Forward Error Correction, FEC) and automatic repeat requests (ARQ) are used. FEC is based on redundancies added in transmission, so that the message still can be corrected and received in the receiver without error, when it contains a few transmission errors. ARQ in contrast is based on the assumption that the receiver can establish when a message was transmitted containing errors. This is generally achieved by using an additional check sum. When the receiver detects an error, it asks the transmitter to send this data packet to it again. For this latter method a bidirectional transmission is necessarily required. ARQ has already been investigated in detail and used in many variations for different applications (high and low error probabilities optimized, as described in A. S. Tanenbaum, "Computernetzwerke [Computer network]", Prentice Hall, Munchen, 1998, pp. 227 to 244; B. Walke, "Mobilfunknetze und ihre Protokolle [Mobil Radio Network and its Protocols] ", B. G. Teubner, Stuttgart, 1998, pp. 91 to 99; D. Petras. "Entwicklung und Leistungsbewertung einer ATM-Funkschnittstelle [Development and Performance Evaluation of an ATM Radio Interface]", Dissertation in RWTH Aachen, 1998, Chapter 8.3, pp. 81 to 85; and D. Bertsekas, R. Gallager, "Data Networks", Prentice-Hall, Englewood Cliffs, N.J., 1992, pp. 64 to 68. All these methods however are based on a bidirectional connection or link, i.e. generally a point-to-point link.

SUMMARY OF THE INVENTION

It is an object of the present invention to provide an improved method for repeat transmission of messages in a centrally controlled communication network.

According to the invention the method for repeat transmission of messages in a centrally controlled communication network, especially a radio network, including a central station, in which several terminals are simultaneously operable in a participating group, comprises the following steps:

a) transmitting of each of the messages from the central station once for reception by the several terminals of the participating group and assigning a respective identifier to the corresponding messages to detect whether or not a transmitted message was incorrect or lost;

b) as soon as a terminal has established an error in or loss of a transmitted message, it issues a repeat request for a repeat transmission of this message over a communication link, especially a point-to-point link, between the central station and the terminal detecting the error or the loss; and c) the central station performs repeat transmissions of the erroneous or lost message in response to the repeat request only within a predetermined time interval;

d) halting the requested repeat transmissions within the predetermined time interval when a predetermined maximum number of repeat transmissions has been reached; and e) halting the requested repeat transmissions within the predetermined time interval when a positive acknowledgement of receipt of the message is received by the central station during the predetermined time interval from the terminal issuing the repeat request;

whereby clogging of the communication network by repeat transmissions is effectively prevented.

During broadcast and multi-cast links, i.e. operating modes, in which terminals are simultaneously operated by the central station, it is possible to transmit repeat requests for repetition of message transmissions with the method according to the invention. Also a message, which should be received by the several terminals of a participating group, is only transmitted once for reception by all participating terminals but the single transmission is received and processed by all participating terminals. The multi-cast operation (groups of several selected terminals of a radio cell) or also broadcast operation (all terminals found in the cell) happens in the current communication systems only in one direction, namely from the central station to the terminals (down-link). The method according to the invention uses another communication link, preferably an existing point-to-point link, between a terminal of the multi-cast group and/or broadcast participants and the central station in order to be able to perform a simple protocol for repeat requests, when a repetition of an error-containing or lost message is required within a predetermined time interval. Because of that the probability for transmission of an error-containing data packet is clearly reduced, without expensive error protecting measures being required. Since a point-to-point transmission for exchange of control information between the terminals and the central station, especially in HIPER-LAN Type 2 communication systems, is provided anyway, no additional expenses for transmission of repeat requests are produced by the method according to the invention.

Repeat requests are of great importance, especially in radio networks, since error-free transmission of data with conventional methods (FEC) cannot be guaranteed because of physically limiting high error rates. In current conventional applications, such as speech transmission or image transmission, see GSM, DVB-T, this is not important, since they tolerate errors to a certain extent. In speech transmission a transmission error generally is noticeable only as a brief interfering noise. However when electronic data, such a software programs or documents, must be transmitted over a radio network, scarcely any errors are tolerated, since they would in most cases make the entire data unreadable.

In preferred embodiments of the method the lengths of the message and predetermined time interval determine the maximum number of repeat transmissions. On the other hand, the terminal detecting the lost or erroneous message can limit the predetermined number of repeat transmissions.

Preferred embodiments of the method include, in addition to the foregoing steps, issuing a positive acknowledgement of each correctly received message or issuing a negative acknowledgment of the lost or erroneous message in order to inform the central station whether or not message repetition is necessary.

In especially preferred embodiments of the method the respective identifiers include corresponding sequence numbers assigned to the transmitted messages, the repeat request includes the one of the sequence numbers corresponding to the message detected as lost or erroneous and the central station repeats transmission of that message with the associated sequence number. Then other messages received by the one terminal detecting the loss or error can be erased or not used when these other messages contain the sequence number of a previously correctly received message. It is only necessary to acknowledge at least one sequence number to inform the central station whether or not message repetition is necessary.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
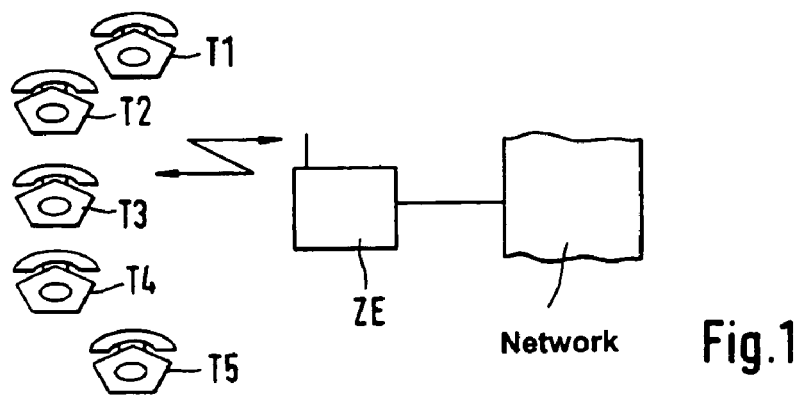
FIG. 1 is a diagram of a centrally controlled communications network in which the method according to the invention cart be used.

The method according to the invention for repeat transmission of messages is performed by the centrally controlled communication network, especially a HIPERLAN Type 2 communication system, illustrated in FIG. 1. The method according to the invention can of course also be applied to processes with other signaling.

In HIPEALAN Type 2 communication Systems a terminal T1, T2, . . . is assigned a temporary address, as long as it is connected with the central station, i.e. is announced as a network participant. The temporary address (MAC-ID) is used during communication in order to address a terminal definitely within a cell. One or more predetermined addresses is or are provided for broadcast and multi-cast transmissions. The central station ZE transmits broadcast and multi-cast messages with the predetermined address or addresses as target or targets. All terminals In a cell, or all which belong to a multi-cast group, receive these messages. As in point-to-point links the messages contain an identifying feature, e.g. a running number (sequence number SN), with the aid of which a terminal can detect, whether a message is lost in the transmission or decoding. As soon as a terminal establishes the loss of a message or an erroneous message with the previously described mechanisms, it sends a repeat request, for example a negative acknowledgment (negative acknowledge NACK), which contains the sequence number of the lost message. This repeat request NACK is transmitted on one of the existing point-to-point links between a respective terminal and the central station ZE. At least one of these links is always present in order to exchange control information. The central station ZE repeats the message with the old sequence number SN. Because of that a terminal can receive the same message several times. Thus it is advantageous that another terminal which is part of the broadcast zone or a multi-cast group and which has already received the message with the correct sequence number erases it. Up to now only erroneous or lost message packets are acknowledged, i.e. in a repeat request whose sequence number is put in place as a negative acknowledgment NACK. Alternatively the correctly received message packet can also be acknowledged as a positive acknowledgment ACK. Instead of confirming a positive or negative acknowledgment, ACK or NACK, with only one sequence number, several can be entered, or all since the last acknowledgment can be positively or negatively acknowledged.

In order to prevent a terminal with very poor channel properties from clogging the entire transmission because of the need for frequent repeat transmissions a predetermined time window or interval is used, especially a so-called ARO (automatic repeat request) window is used. This ARO window is controlled so that a message can be repeated only within a predetermined time interval. The temporal granularity for this time window is the length of a message. A counter is provided for control of this time window, which increments with the sequence number SN. A modulo n counter is used particularly for that purpose, i.e. it jumps back to 0 after reaching a maximum value (N−1) and begins to increment again. N gives the number of successive messages. The window size then is given by the length of a message multiplied by the value N−1. A repetition is accordingly only possible within SN+(N−1) transmitted messages. Thus the number of possible sequence numbers should be at least twice the number of the size of the ARQ window, in order to obtain a definite correlation. It is advantageous to limit the number of the maximum possible repeat requests of a certain message by a single terminal in order to prevent a delay of the transmission process by a rapid series of repeat requests from one terminal.

Figure 2:
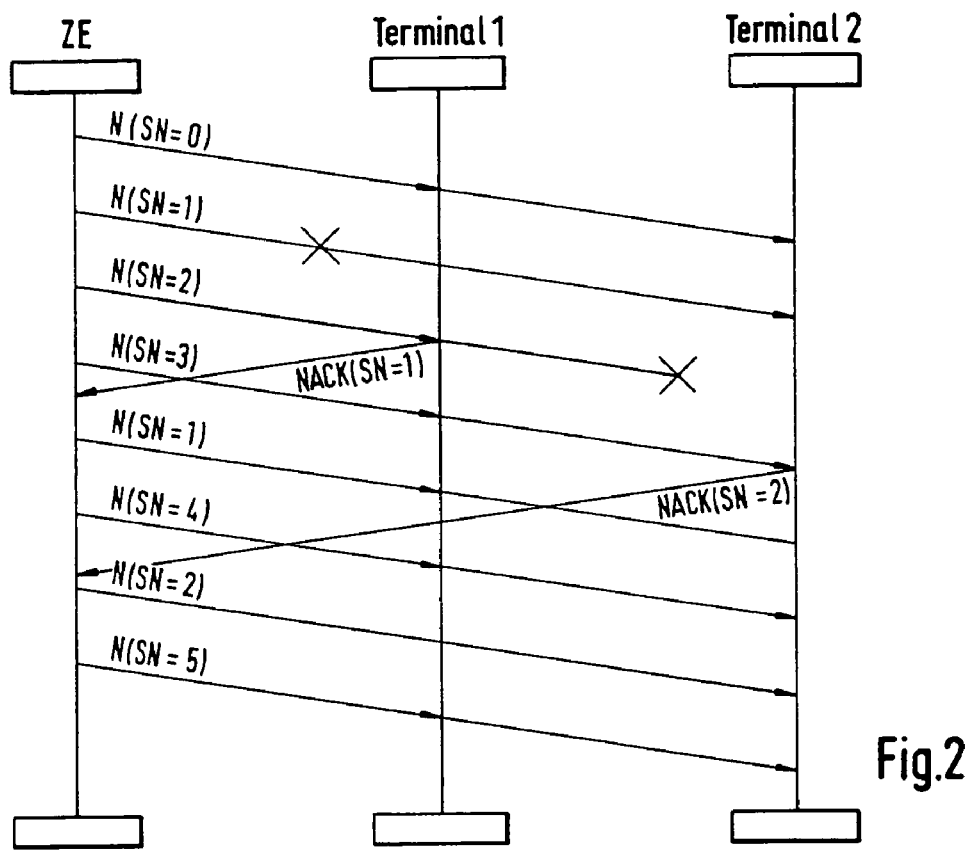
FIG. 2 is a diagram showing the course of a repeat request of an error-containing message.
Figure 3:
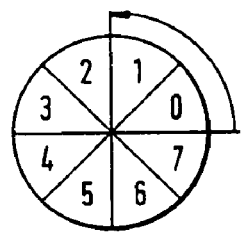
FIG. 3 is a diagram illustrating control of the time interval.

Only the preceding seven messages are stored in the central station ZE and also accordingly a repeat of only these seven messages is possible, based on a modulo-8 window in the embodiment shown in FIGS. 2 and 3. FIG. 2 is a message flow diagram. A central station ZE and two terminals 1 and 2 are shown in FIG. 2. The vertical lines extending from the blocks represent respective time axes so that time increases in a downward direction. The central station ZE transmits a message that includes a sequence number SN, Reception of the message is indicated by an arrow reaching the time axis of the terminal receiving it. The erroneous transmission of the message is indicated by an X. As soon as a terminal receives a message with a sequence number larger than expected, it sends out a repeat request, i.e. a negative acknowledgment NACK with the expected sequence number SN In FIG. 2 message 1 from terminal 1 would not be received or would be received with an error. This error is detected by the receiver of message 2 by the omitted sequence number and the repeat request NACK is sent back. After the input of the repeat request NACK to the central station ZE it transmits the corresponding message N (SN=1) again (after N(SN−3)). Terminal 1 receives now this message and resets its ARO window. Terminal 2 has received this message already error free for the first time and rejects the repeat transmission which is indicated by the absent arrow tip or arrowhead. Message 2 (SN=2) was received erroneously in contrast by terminal 2 and accordingly requests again and also transmits.

A memory is used for repetition of the messages within the ARQ window. The memory is controlled so that a message transmitted again writes over the oldest version of the message still in the memory. FIG. 3 shows the principal process for doing that. A modulo 8 buffer is provided, in which each segment of the circle illustrated in FIG. 3 indicates a buffer location. A fresh message overwrites a respective messages which is older by about eight intervals, i.e. having about eight steps lower sequence number.

While the invention has been illustrated and described as embodied in a method for repeat transmission of messages in a centrally controlled communication network, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method for repeat transmission of messages in a centrally controlled communication network, in which several terminals (T1, T2, . . . ) are simultaneously configured to operate, said method comprising:
    a) transmitting each of said messages once from a central station (ZE) for reception by each of said terminals (T1, T2, . . . ) of a participating group of said terminals and assigning respective sequence numbers (SN) to corresponding messages for detection of message loss or message error;
    b) as soon as one of said terminals (T1, T2, . . . ) has detected an error in or loss of one of the messages, said one of said terminals detecting said error or said loss issues a repeat request for said one of said messages over a communication link between the central station (ZE) and the terminal (T1, T2, . . . ) detecting said error or said loss, said repeat request including one of said sequence numbers (SN) identifying said one of said messages detected as lost or erroneous;
    c) said central station (ZE) performs repeat transmissions of said one of said messages with said one of said sequence numbers (SN) in response to the repeat request, but only within a predetermined time interval;
    d) halting said repeat transmissions of said one of said messages within said predetermined time interval when a predetermined maximum number of repeat transmission of said one of said messages has been reached within said predetermined time interval; and
    e) halting said repeat transmissions of said one of said messages within said predetermined lime interval when a positive acknowledgement of receipt of said one of said messages is received by said central station during said predetermined time interval from said terminal issuing said repeat request;
    whereby clogging of said communication network by said repeat transmissions is effectively prevented.

2. The method as defined in claim 1, wherein said centrally controlled communication network is a radio network and said communication link is a point-to-point link.

3. The method as defined in claim 1, wherein said maximum number of said repeat transmissions is determined by a length of said predetermined time interval and a length of said message.

4. The method as defined in claim 1, wherein said repeat transmissions are limited by said one of said terminals detecting said loss or said error.

5. The method as defined in claim 1, further comprising positively acknowledging each correctly received message or issuing a negative acknowledgment (NACK) of each lost or erroneous message in order to inform said central station (ZE) whether or not message repetition is necessary.

6. The method as defined in claim 1, further comprising erasing or not using said one of said messages received by at least one other of said terminals of said participating group if said one of said messages was previously correctly received by said at least one other of said terminals.

7. The method as defined in claim 1, wherein only one of said sequence numbers is acknowledged in order to inform said central station (ZE) whether or not message repetition is necessary.

8. The method as defined in claim 1, wherein a plurality of said sequence numbers of all previous ones of said messages since an immediately preceding acknowledgment are positively or negatively acknowledged in order to inform said central station (ZE) whether or not message repetition is necessary.

9. The method as defined in claim 1, further comprising storing only a predetermined number of sequentially transmitted messages in a memory of said central station (ZE) for repeat transmission of said transmitted messages and controlling said memory so that a newly transmitted message overwrites an oldest one of said transmitted messages stored in said memory of said central station (ZE).

10. The method as defined in claim 1, wherein said participating group consists of all of or less than all of said terminals in said communication network.

11. The method as defined in claim 1, further comprising assigning a temporary address in said central station (ZE) to each of said terminals of said participating group.

12. The method as defined in claim 1, further comprising assigning at least one predefined address to each of said terminals of said participating group for simultaneous transmission of said messages to each of said terminals in a broadcast and/or multi-cast operation.

* * * * *